United States Patent
Reial

(10) Patent No.: US 8,238,499 B2
(45) Date of Patent: Aug. 7, 2012

(54) METHOD AND APPARATUS FOR LOW-COMPLEXITY INTERFERENCE CANCELLATION IN COMMUNICATION SIGNAL PROCESSING

(75) Inventor: Andres Reial, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1013 days.

(21) Appl. No.: 12/201,303

(22) Filed: Aug. 29, 2008

(65) Prior Publication Data
US 2010/0054373 A1  Mar. 4, 2010

(51) Int. Cl.
*H03D 11/04* (2006.01)
(52) U.S. Cl. ........ 375/348; 375/148; 455/63.1; 455/296
(58) Field of Classification Search ............... 375/144, 375/148, 267, 284, 285, 340, 346–349; 455/501, 455/63.1, 65, 67.11, 67.13, 226.1, 226.2, 455/226.3, 296; 370/317, 320, 342, 441, 370/465, 479
See application file for complete search history.

(56) References Cited

U.S. PATENT DOCUMENTS

| 5,644,592 | A   |   | 7/1997  | Divsalar et al.   |         |
|-----------|-----|---|---------|-------------------|---------|
| 6,470,047 | B1  | * | 10/2002 | Kleinerman et al. | 375/232 |
| 6,611,794 | B1  | * | 8/2003  | Fleming-Dahl      | 702/191 |
| 6,931,052 | B2  |   | 8/2005  | Fuller et al.     |         |
| 7,321,581 | B2  |   | 1/2008  | Wei et al.        |         |
| 7,697,595 | B2  | * | 4/2010  | Nagarajan et al.  | 375/148 |
| 2002/0007257 | A1 |   | 1/2002  | Riess et al.      |         |
| 2004/0037380 | A1 |   | 2/2004  | Shan              |         |
| 2006/0227854 | A1 |   | 10/2006 | McCloud et al.    |         |
| 2006/0227909 | A1 | * | 10/2006 | Thomas et al.     | 375/346 |
| 2006/0240794 | A1 |   | 10/2006 | Cozzo et al.      |         |
| 2007/0263704 | A1 |   | 11/2007 | Nagarajan et al.  |         |
| 2011/0080923 | A1 | * | 4/2011  | McCloud et al.    | 370/479 |
| 2011/0292974 | A1 | * | 12/2011 | Lamba et al.      | 375/148 |

FOREIGN PATENT DOCUMENTS
WO  02/098090 A1  12/2002

OTHER PUBLICATIONS

Kim, S. R. et al. "Multi-Mode Subtractive Interference Cancellation for Asynchronous Multi-Path Channels." IEEE 49th Vehicular Technology Conference, 1999. vol. 2, May 16-20, 1999, pp. 1430-1434.

(Continued)

Primary Examiner — Dac Ha
(74) Attorney, Agent, or Firm — Coats & Bennett, P.L.L.C.

(57) ABSTRACT

The teachings herein disclose interference cancellation processing that uses hard decision logic for simplified estimation of interfering signals, in combination with soft scaling of the hard decisions for better interference cancellation performance, particularly in low signal quality conditions. In one aspect, the soft scaling may be understood as attenuating the amount of interference cancellation applied by a receiver, in dependence on the dynamically changing received signal quality at the receiver. More attenuation is applied at lower signal quality because the hard decisions are less reliable at lower signal qualities, while less (or no) attenuation is applied at higher signal qualities, reflecting the higher reliability of the hard decisions at higher signal qualities. Signal quality may be quantized into ranges, with a different value of soft scaling factor used for each range, or a soft scaling factor may be calculated for the continuum of measured signal quality.

23 Claims, 6 Drawing Sheets

OTHER PUBLICATIONS

Manohar, S. et al. "BER Analysis of Weighted Interference Cancellation in Multicarrier DS-CDMA Systems." IEEE Wireless Communications and Networking Conference, 2006 (WCNC 2006). vol. 2, Sep. 18, 2006, pp. 1003-1008.

Khayrallah, A. et al. "Method and Apparatus for Successive Interference Subtraction with Covariance Root Processing." Co-pending U.S. Appl. No. 12/103,145, filed Apr. 15, 2008.

Kaiser et al., "Multi-Carrier CDMA with Iterative Decoding and Soft-Interference Cancellation," Global Telecommunications Conference—Globecom '97, Phoenix, Arizona, Nov. 3-8, 1997, pp. 6-10, IEEE, New York, NY, US.

Saadani et al., "An Hybrid PIC Based Receiver Using Code Estimation for HSDPA Multiuser Interference Cancellation," 16th International Symposium on Personal, Indoor and Mobile Radio Communications—PIMRC 2005, Berlin, Germany, Sep. 11-14, 2005, pp. 2400-2404, IEEE, Piscataway, NJ, US.

* cited by examiner

METHOD AND APPARATUS FOR LOW-COMPLEXITY INTERFERENCE CANCELLATION IN COMMUNICATION SIGNAL PROCESSING

TECHNICAL FIELD

The present invention generally relates to communication signal processing, and particularly relates to interference cancellation.

BACKGROUND

In wireless communications systems, different signals often share the same propagation resources. Different communication systems provide various mechanisms for separating signals (e.g., in the time, frequency, or code domain), but separation seldom is perfect because of transmission synchronization errors, Doppler spread or dispersion in the channel, etc. Further, with multiple-input-multiple-output (MIMO) systems, multiple data streams are transmitted to the same user over the same resource space, so that the signal separation relies only on propagation channel differences for the different transmit/receive antenna pairs. Even where MIMO pre-coding is used to improve separation between the data streams, the signals typically are significantly coupled at the receiver.

In all these cases, the different user signals or the multiple streams interfere with each other at the receiver. The receiver may be understood as receiving a composite signal, including any number of component signals. One or more component signals generally are of interest to the receiver, but the recovery of any given signal of interest is complicated by interference caused by the remaining signals.

A known approach to interference cancellation depends on the detection of interfering signals with the same processing complexity used to detect the desired signal(s). This approach applies full-complexity demodulation and decoding to the interfering signals, including soft value processing. Accurate determination of the interfering signals allows correspondingly accurate reconstruction of the interfering signals for interference cancellation. Full processing of interfering and desired signals, however, imposes a significant signal processing burden on the receiver and makes the approach not feasible or at least undesirable for low-complexity receivers.

A simplification to full processing of interferer signals involves simplified interferer signal estimation through hard detection processing. With hard detection processing, interferer signals are estimated based on hard detection, e.g., hard-detecting interferer signal bits as 1s or 0s rather than as soft-valued likelihoods. Reconstruction of the interferer signals is simplified by hard detection, albeit with potentially significant decreases in estimation accuracy and corresponding interference cancellation performance than that provided by full processing of the interferer signals.

SUMMARY

The teachings herein disclose interference cancellation processing that uses hard decision logic for simplified estimation of interfering signals, in combination with soft scaling of the hard decisions for better interference cancellation performance, particularly in low signal quality conditions. In one aspect, the soft scaling may be understood as attenuating the amount of interference cancellation applied by a receiver, in dependence on the dynamically changing received signal quality at the receiver. More attenuation is applied at lower signal quality because the hard decisions are less reliable at lower signal qualities, while less (or no) attenuation is applied at higher signal qualities, reflecting the higher reliability of the hard decisions at higher signal qualities. Signal quality may be quantized into ranges, with a different value of soft scaling factor used for each range, or a soft scaling factor may be calculated for the continuum of measured signal quality.

In one embodiment of the present teachings, a method of interference cancellation comprises generating interfering symbol estimates for interfering symbols in a composite signal by making hard decisions at a bit or symbol level, and computing scaled interfering symbol estimates by soft scaling the interfering symbol estimates as a function of received signal quality. The method continues with obtaining a reduced-interference composite signal by combining the scaled interfering symbol estimates with the composite signal, and detecting symbols of interest from the reduced-interference composite signal.

The method applies to a wide range of signal types and, as a non-limiting example, can be used in multi-stream MIMO (multiple-input-multiple-output) systems. Furthermore, the method can be implemented in a variety of wireless communication receiver types, e.g., in wireless communication base stations and/or mobile stations in cellular communication networks, such as Wideband-CDMA (WCDMA) networks or Long Term Evolution (LTE) networks.

In another embodiment of the present teachings, a wireless communication receiver comprises one or more processing circuits, e.g., digital signal processing circuits such as one or more baseband processors, DSPs, microcontrollers, ASICs, or other digital processing circuitry that implements interference cancellation as taught herein via hardware, software, or any combination thereof. The one or more processing circuits are configured to generate interfering symbol estimates for interfering symbols in a composite signal by making hard decisions at a bit or symbol level, and compute scaled interfering symbol estimates by soft scaling the interfering symbol estimates as a function of received signal quality. Further, the one or more processing circuits are configured to obtain a reduced-interference composite signal by combining the scaled interfering symbol estimates with the composite signal and detect symbols of interest from the reduced-interference composite signal.

However, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
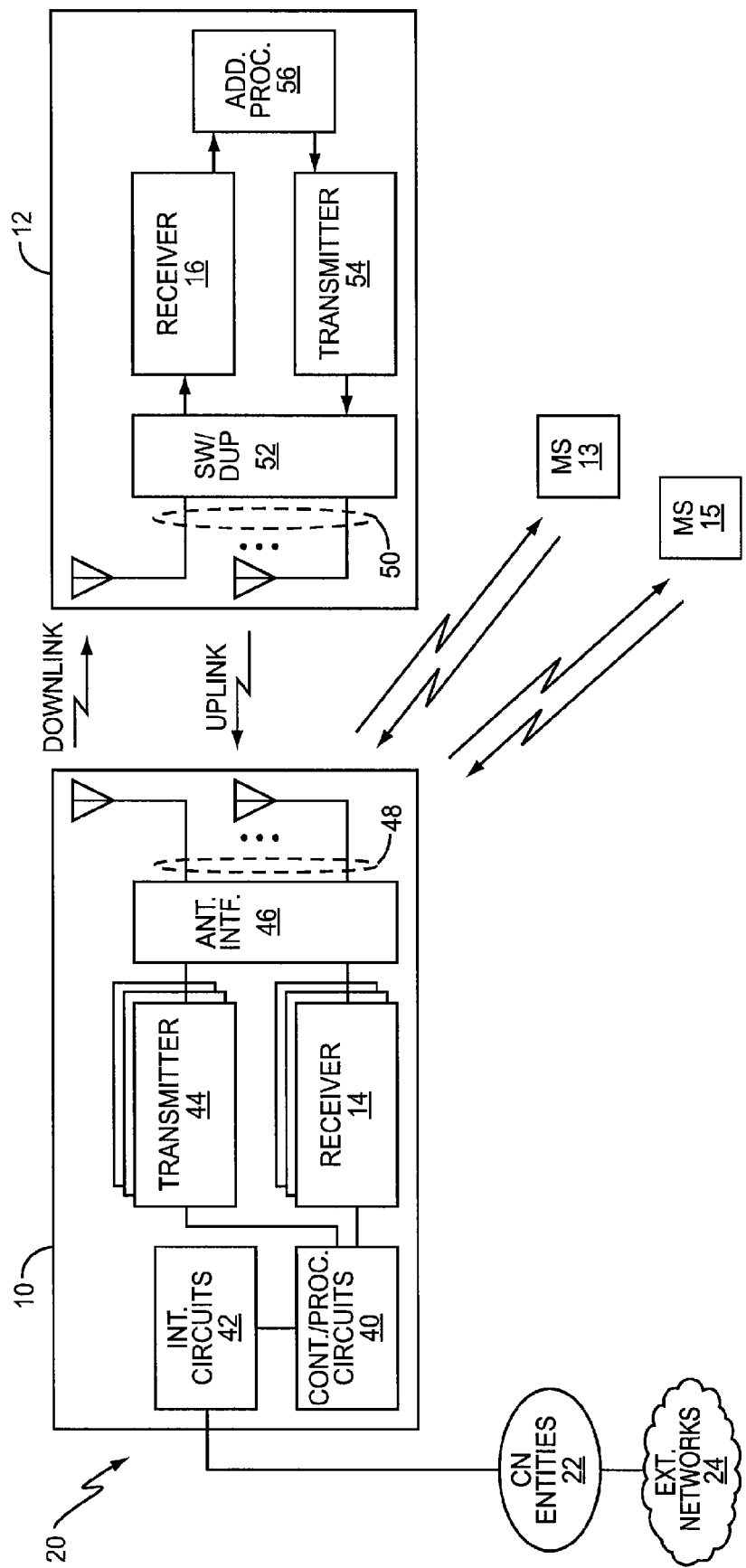
FIG. 1 is block diagram of one embodiment of a wireless communication network, wherein the illustrated base station and/or mobile stations include a receiver configured according to the interference cancellation teachings presented herein.

FIG. 1 illustrates one embodiment of a base station 10 that transmits downlink signals to a mobile station 12, and receives uplink signals from the mobile station 12. The base station 10 includes a receiver 14 for processing uplink signals received from the mobile station 12. Likewise, the mobile station 12 includes a receiver 16 for processing downlink signals received from the base station 10. The base station and mobile station are configured for operation in a Wideband-CDMA (WCDMA) network in one embodiment, and for Long Term Evolution (LTE) operation in another embodiment, but these should be understood as non-limiting examples. It should be understood the base station 10 may support other mobile stations, e.g., mobile stations 13 and 15.

According to the teachings presented herein, one or both of the receivers 14 and 16 are configured to carry out a method of interference cancellation that uses hard decision logic for simplified estimation of interfering signals, in combination with soft scaling of the hard decisions for better interference cancellation performance, particularly in low signal quality conditions. This implementation provides for an interference canceling (IC) receiver structure that is robust and has low incremental complexity compared to a non-IC receiver, while still providing performance improvements with respect to non-IC receivers, and with respect to IC receivers that perform interference cancellation using hard-detected interference estimates, but perform such cancellation only in high signal quality conditions.

With the teachings presented herein, interference cancellation is performed over the entire signal quality operating range (e.g., the entire signal-to-interference ratio or SIR range), without need for complex heuristic mechanisms for turning interference cancellation on and off. From another perspective, one of the advantages gained through these teachings is a significant complexity reduction compared to interference cancellation based on full soft-value processing (e.g., full expected value processing of interfering symbols). Such complexity reductions are, in particular, fully realized in the embodiment contemplated herein where the scaling factors used for soft scaling hard-detected interfering signal values are pre-computed. In one example of pre-computed values, a receiver stores a look-up table of soft scaling values that are indexed as a function of measured received signal quality.

Those skilled in the art will appreciate that the receiver teachings presented herein are independent of the communication standards at issue, e.g., independent of any particular radio access technology. Thus, top-level architectural details for communication networks, base stations, mobile stations, etc. are not needed for understanding the receiver teachings herein; however, non-limiting examples of such details are helpful in establishing a context for discussion. To that end, and returning to the example illustration of FIG. 1, one sees that the base station 10 comprises part of a wireless communication network 20, which also includes one or more additional core network (CN) entities 22 communicatively coupling the network 20 to one or more external networks 24, e.g., the Internet, PSTN, and/or other communication networks.

The base station 10 thus communicatively couples mobile stations to each other and/or to other communication networks by transmitting downlink signals to them and receiving uplink signals from them. In support of these functions, the base station 10 includes call control and processing circuits 40, interface circuits 42, the aforementioned receiver 14, which may comprise a portion of overall receiver circuitry in the base station 10, one or more transmitters 44, an antenna interface 46, and one or more transmit/receive antennas 48. In one embodiment, the base station 10 comprises a multiple-input-multiple-output (MIMO) base station, and thus uses the antennas 48 for transmitting multiple streams to one or more users (mobile stations). In at least one MIMO embodiment, the transmitter(s) 44 includes pre-coding circuits, which apply pre-coding matrices to the multiple streams being transmitted, corresponding to desired per-antenna transmit power weightings for the different MIMO streams.

In such embodiments, one or more of the mobile stations 12, 13, and 15 are configured for MIMO operation, although non-MIMO embodiments are contemplated herein. With the mobile station 12 as an illustrated example, one sees that it includes one or more transmit/receive antennas 50, antenna interface circuits 52 (e.g., a switch and/or duplexer), the aforementioned receiver 16, a transmitter 54, and additional processing circuits 56, which may include one or more microprocessors for controlling operation of the mobile station, and one or more interface circuits for user interaction with the mobile station.

Figure 2:
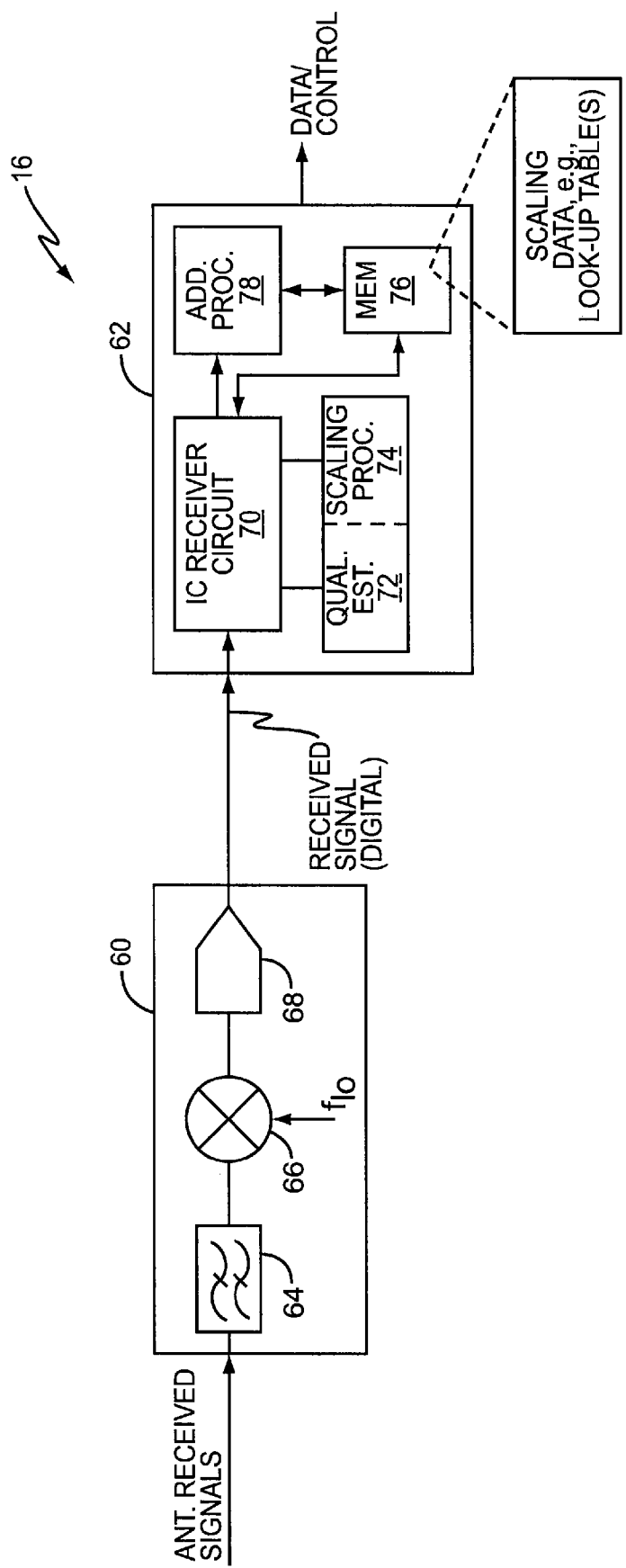
FIG. 2 is a block diagram of one embodiment of a mobile station receiver configured according to the interference cancellation teachings presented herein.

Continuing with the example of mobile station 12, one sees in FIG. 2 that in at least one embodiment the receiver 16 comprises a receiver front-end 60 and one or more processing circuits 62, referred to herein as a "baseband processor." The receiver front-end 60 processes antenna-received signals, e.g., a received composite signal including one or more component signals received on one or more of the mobile station's antennas. In one embodiment, such processing includes filtering/gain control 64, down-conversion 66, and digitization 68. The baseband processor 62 therefore receives one or more streams of digital samples corresponding to the time-varying antenna-received signals.

In at least one embodiment, the digital sample stream(s) input to the baseband processor 62 comprise in-phase (I) and quadrature (Q) data streams for one or more signals. Further, it should be understood that in one or more embodiments the input digital samples are a composite of more than one signal, one or more of which constitute "desired signals" and the remaining ones constituting "interfering signals." More particularly, a given signal may be a desired signal but it still represents interference with respect to the detection of another desired signal. With that point in mind, the IC receiver circuit 70 is configured to perform interference cancellation for each of one or more desired signals included in a received composite signal.

Although other arrangements are contemplated for processing received signals, the illustrated embodiment of the baseband processor 62 includes an interference-canceling (IC) receiver circuit 70, which includes or is associated with a signal quality processor 72, a scaling processor 74, and memory 76. Memory 76 may comprise more than one device and/or more than one type of memory. For example, the baseband processor 62 may include or otherwise have access to volatile memory (cache and/or off-chip) for working computations and data, and have access to one or more types of non-volatile memory for storing computer program instructions, configuration data, look-up tables, etc., such as FLASH and/or EEPROM memory. The baseband processor 62 also may include additional processing circuits 78, such as receiver/transmitter, control and signaling circuits.

It will be understood that execution of the stored computer program instructions configure the receiver 16 for operation according to the method teachings presented herein. In support of this execution and resultant processing, the baseband processor 62 in one or more embodiments comprises a general or special-purpose microprocessor or digital signal processor. Of course, in one or more embodiments, at least some of the received signal processing of interest herein may be performed at least in part using hardware-based circuits.

Figure 3:
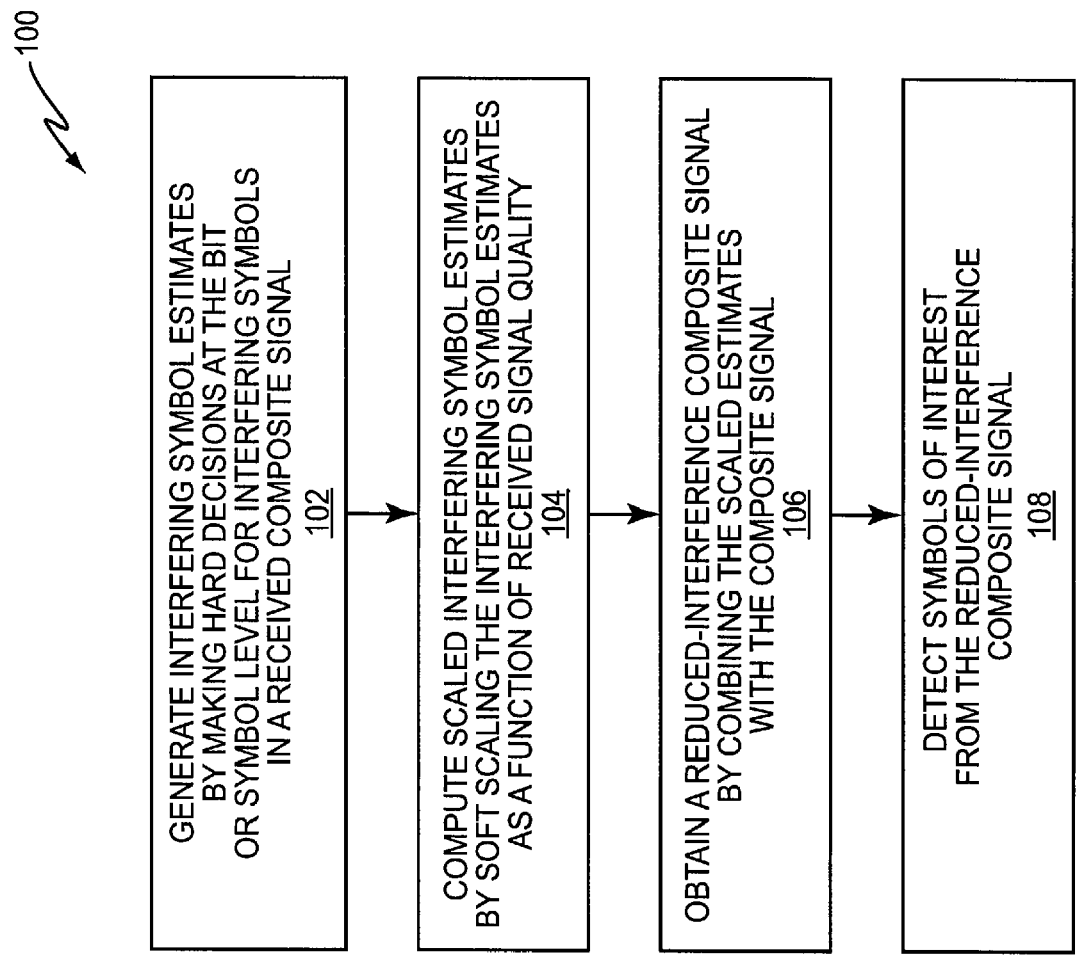
FIG. 3 is a logic flow diagram of one embodiment of a method for carrying out the interference cancellation teachings presented herein.

FIG. 3 illustrates one embodiment of a method 100 of interference cancellation as contemplated herein, and it should be understood that the mobile station receiver 16 and/or the base station receiver 14 are configured to carry out this method, or variations of it, in one or more embodiments. It should also be understood that the illustrated order of processing is not intended as a limitation. One or more processing steps may be performed in a different order, or performed concurrently, or performed as part of ongoing foreground and/or background processing operations. As such, the illustrated processing may be performed as part of a larger set of ongoing receiver/device processing, and may be looped or iterated as needed or desired.

With these qualifiers in mind, the illustrated processing includes generating interfering symbol estimates for interfering symbols in a composite signal by making hard decisions at a bit or symbol level (Block 102), and computing scaled interfering symbol estimates by soft scaling the interfering symbol estimates as a function of received signal quality (Block 104). The method 100 continues with obtaining a reduced-interference composite signal by combining the scaled interfering symbol estimates with the composite signal (Block 106), and detecting symbols of interest from the reduced-interference composite signal (Block 108).

In one embodiment, computing scaled interfering symbol estimates by soft scaling the interfering symbol estimates as a function of received signal quality comprises determining a soft scaling factor as a function of the received signal quality, and scaling the interfering symbol estimates by the soft scaling factor. Such embodiments also include determining the received signal quality based on determining an average symbol quality after combining and equalization processing of the symbols of interest, or determining the received signal quality based on determining an average log-likelihood-ratio for the symbols of interest after demodulation.

Broadly, received signal quality may be determined dynamically, on an ongoing basis, and may be based on determining the received signal quality as a signal-to-noise ratio (SNR) or a signal-to-noise-plus-interference ratio (SINR). These measurements can be made using the signal(s) of interest, and generally are performed in any case for other reasons, such as for channel quality reporting, etc. Further, making hard decisions at a bit or symbol level (for the interfering signals) generally comprises making hard symbol decisions for the interfering symbols or demodulating the interfering symbols to obtain soft bit values and making hard decisions on the soft bit values.

In any case, computing scaled interfering symbol estimates by soft scaling the interfering symbol estimates as a function of received signal quality comprises, in one or more embodiments, selecting a pre-computed soft scaling factor as a function of the received signal quality. Such selection comprises, for example, accessing a look-up table that is indexed as a function of received signal quality. In at least one implementation, the look-up table comprises a data structure containing different values for the soft scaling factor corresponding to different values or ranges of received signal quality. While such processing may be practiced with one look-up table, it is also contemplated herein to store different look-up tables for different modulation and coding schemes, and access a particular one of the different look-up tables in dependence on the modulation and coding scheme associated with the symbols of interest.

An example, look-up table for QPSK is given in the form of (SIR (dB), α) as (−14.0000, 0.0103), (−13.0000, 0.0130), (−12.0000, 0.0165), (−11.0000, 0.0209), (−10.0000, 0.0267), (−9.0000, 0.0340), (−8.0000, 0.0434), (−7.0000, 0.0553), (−6.0000, 0.0713), (−5.0000, 0.0910), (−4.0000, 0.1163), (−3.1000, 0.1476), (−2.1000, 0.1865), (−1.1000, 0.2331), (−0.2000, 0.2888), (0.8000, 0.3511), (1.7000, 0.4196), (2.5000, 0.4922), (3.4000, 0.5670), (4.2000, 0.6409), (5.0000, 0.7145), (5.8000, 0.7827), (6.6000, 0.8443), (7.4000, 0.8960), (8.2000, 0.9376), and (9.0000, 1.0000). Further, an example look-up table for 64QAM is (−14.0000, 0.0213), (−13.0000, 0.0262), (−12.0000, 0.0324), (−11.0000, 0.0405), (−10.0000, 0.0500), (−9.0000, 0.0617), (−8.0000, 0.0757), (−7.0000, 0.0926), (−6.0000, 0.1132), (−5.0000, 0.1373), (−4.0000, 0.1651), (−3.1000, 0.1980), (−2.1000, 0.2356), (−1.1000, 0.2776), (−0.2000, 0.3219), (0.8000, 0.3695), (1.7000, 0.4208), (2.5000, 0.4746), (3.4000, 0.5255), (4.2000, 0.5799), (5.0000, 0.6326), (5.8000, 0.6809), (6.6000, 0.7282), (7.4000, 0.7724), (8.2000, 0.8142), (9.0000, 0.8493), (9.9000, 0.8781), (10.7000, 0.9050), (11.6000, 0.9256), (12.5000, 0.9476), (13.4000, 0.9904), and (14.3000, 1.0000).

In these and other embodiments, the scaling factor may be defined as a scalar value that takes on discrete or continuous values between zero and one, as a function of the received signal quality. Further, in one or more embodiments, the scaling factor is set to unity if the received signal quality is above a defined quality threshold. In other words, a scaling factor of "1" may be used during times of high received signal quality. Of course, such operation is optional.

As another option, but one which offers potentially significant operational advantages, the receiver 16 (or 14) may determine combining weights at least in part based on the scaling factor, where the combining weights are used in combining signal values for the symbols of interest. In this regard, the receiver 16 (or 14) may be configured to determine combining weights based on impairment correlation estimations that include correlation terms relating to inter-signal interference between a desired signal and one or more interfering signals. These impairment correlation terms, which capture the correlation of such inter-signal interference, may be scaled or otherwise compensated using the scaling factor, to reflect the reduction of interference in the reduced-interference composite signal from which desired signal symbols are detected.

The method may be carried out in a variety of IC receiver structures, including parallel IC (PIC) receivers and successive IC (SIC) receivers. For a SIC receiver including two or more successive interference cancellation stages, at least one stage is configured to perform soft-scaling based interference cancellation for a composite signal input to that stage. In a single-stage SIC (with one interferer), soft scaling is used in the one stage, for hard decisions determined for the one interferer. As a PIC example, a PIC receiver includes two or more parallel interference cancellation stages, where at least one stage is configured to perform soft-scaling based interference cancellation for a composite signal input to that stage.

Regardless of the particular receiver structure adopted, it will be understood that the soft-scaling of hard-detected interfering signals as taught herein may be applied to one or more signals included in a received composite signal. Particularly, the modulated symbols representing the signals for other users (e.g., other mobile stations) or representing data streams not of interest in a MIMO context can be produced with low computational overhead by applying hard decisions at the bit level or at the symbol level. These hard-detected interfering symbols are then scaled to match the expected signal level corresponding to the given SIR or soft value quality. As noted, the scaling factor(s) may be pre-computed and stored in a look-up table.

In more detail, after a symbol estimate for an interfering signal is demodulated, the individual bit soft values (LLR-s) reflect the reliability of each bit. Using this information, the expected modulated symbol may be computed as $$\hat{s} = E[s \mid RX \text{ data}] = \sum_{l=1}^{L} p_l d_l, \quad \text{Eq. (1)}$$

with $$P_l = \prod_{m=1}^{M} P{l,m}, \quad \text{Eq. (2)}$$

and where $d_l$ are the constellation points, $l=1 \ldots L$, $p_{l,m}$ is the probability that the transmitted bit for position m in the symbol equals the m-th bit value of constellation point l, $m=1 \ldots M$, $M=\log_2 L$. One may express this probability as $$P{l,m} = \begin{cases} \dfrac{1}{1+e^{\lambda_m}} & b_{l,m} = 1 \\ \dfrac{1}{1-e^{\lambda_m}} & b_{l,m} = 0 \end{cases}, \quad \text{Eq. (3)}$$

where $\lambda_m$ is the log-likelihood ratio (LLR) for bit m and $b_{l,m}$ is the bit value for constellation point l, bit position m.

Note that this expectation is given the a priori info from demodulation; the non-informed expectation would of course be zero for symmetrical constellations. For near-zero LLR-s $\lambda_m$, all symbol probabilities $P_l$ end up roughly equal and the expected symbol values $\hat{s}_l$ for a symmetric constellation (which is the typical design) are close to zero. Therefore, the average power of the expected modulated symbol $E\lfloor|\hat{s}_l|^2\rfloor$ is low when the LLR magnitudes are low. On the other hand, when the LLR-s indicate reliable bits, one single constellation point $d_l$ will carry most of the probability mass for each symbol estimate, so the average expected symbol magnitude will be close to the average QAM constellation power. (Assuming Quadrature Amplitude Modulation or QAM is the basis for the modulation constellation. Of course, QAM is merely an example of a symmetrical modulation constellation where the LLR magnitudes indicate bit reliability, but the teachings herein are not limited to QAM.)

Those skilled in the art will note that a simplified LLR generation routine is often used for Max-Log-MAP Turbo decoders, where the LLR values have magnitudes not reflecting the SIR of the propagation environment. The expected symbol approach being described here requires correct absolute LLR magnitudes, so additional scaling as a function of the SIR can be applied. This may be done, for example, as $$\lambda_m = c \frac{1}{SIR} \lambda_m^{orig}, \quad \text{Eq. (4)}$$

where $\lambda_m^{orig}$ is the original LLR without scaling, and where the factor c depends on how the original LLR-s are computed.

One aspect of the teachings herein is that the dependency of the expected symbol magnitude as a function of received signal quality may be taken advantage of, even when the expected symbol values are not explicitly computed in the receiver. In other words, the soft scaling of hard-detected interfering symbols contemplated herein can be based on the use of a soft scaling factor that derives from or otherwise reflects the relationship between expected symbol magnitudes and received signal quality, and the corresponding reliability of hard detection. By imposing appropriate scaling on the modulated symbol estimates produced by hard detection at the symbol or bit level, the receiver contemplated herein avoids excessive (incorrect) interference cancellation when the quality or reliability of hard detection is low.

A soft scaling factor $\alpha$ may be calculated by evaluating the average power of the expected symbol values and the relevant modulation constellation, e.g., a QAM constellation. Because, as explained previously, the expected symbol power depends on the reception quality, characterized e.g., by the post-combining SINR value, the resulting value of $\alpha$ is a function of e.g. the prevailing SINR value. The scaling factor thus may be expressed as $$\alpha = \frac{E[|\hat{s}|^2]}{E[|d|^2]}. \quad \text{Eq. (5)}$$

Of course, one advantageous aspect of the low-complexity interference cancellation taught herein is that the receiver need not perform full soft-value processing of the interfering signal(s) to be suppressed, e.g., need not carry out full expected value processing for the interfering symbols. Thus, the soft scaling factor $\alpha$ may be pre-computed for a number of SIR operating points and stored in receiver memory, such as in a look-up table. (See FIG. 2, for an example look-up table stored in memory 76, included in or accessible to the IC receiver circuit 70 within the baseband processor 62.)

A receiver, e.g., base station receiver 14 and/or mobile station receiver 16 from FIG. 1, can be pre-configured with the appropriate scaling factor values, based on determined relationships between hard-detection reliability and received signal quality. As a non-limiting example, the mobile station 12 can be configured with different scaling factor values for different ranges or values of received signal quality. Such configuration may be done at manufacture or during configuration by a system operator or other vendor, for example.

In any case, one embodiment of determining the appropriate scaling factor values includes the following steps or operations: for the modulation constellation size $L=\{L1, \ldots, Ln\}$, create a sequence of modulated symbols; set the variance var=var_min:var_min and noise according to a simulated interferer signal ("sig2"); demodulate the symbol sequence; compute the expected symbol values; estimate average expected symbol power; compute symbol SINR or estimate average LLR magnitude; store the SINR value or the LLR magnitude along with the corresponding value for $\alpha$ (i.e., store a data point as $\{SINR, \alpha\}$, or as $\{LLR \text{ mag.}, \alpha\}$). With this approach, a different value of the scaling factor $\alpha$ can be stored for different SINRs or LLR magnitudes. For example, a given range of SINRs or LLR magnitudes can be quantized into a given number of regions, and a different value of the scaling factor α can be stored for each such region. In "live" processing, the receiver determines SINR or LLR magnitude for symbols of interest—which is processing it would do as part of desired signal processing—and then selects the appropriate value of the scaling factor α to use for soft-scaling the hard-detected interfering symbols.

In one or more embodiments, each modulation scheme (constellation size) may have a dedicated table of scaling factor values. That is, the receiver may store a different table of scaling factor values for each modulation scheme that the receiver supports. This approach yields the best scaling accuracy, but some embodiments use the same set of soft scaling values for more than one modulation scheme. Indeed, one or more embodiments contemplated herein trade off scaling accuracy for implementation convenience, and simply use one table of scaling values for all modulation schemes.

Note that, because the post-combining/equalization symbol SIR and LLR quality relationship is essentially channel-independent, arbitrary single-user (e.g. AWGN) simulations may be used advantageously to build the tables. In live receiver operation, the average symbol SINR after combining/equalization or the average LLR magnitude after demodulation may be used as the look-up parameters to fetch the appropriate scaling value.

The soft scaling correction in the receiver thus only requires scaling the interfering symbol estimates with a predetermined scalar factor, which may be $\sqrt{\alpha}$. Here, the receiver may store different values for α, where the α values represent power. In such cases, because the scaling of interfering symbol estimates is a signal magnitude operation, the receiver uses $\sqrt{\alpha}$ for the actual scaling operation, to obtain the scaled interfering symbol estimates used for interference cancellation. Of course, those skilled in the art will appreciate that the receiver could simply store scaling factor values in the form of $\sqrt{\alpha}$. In such cases, the receiver could compute $(\sqrt{\alpha})^2 = \alpha$ as needed. For example, the receiver would compute α for use in channel quality reporting, such that channel quality reporting, which depends on signal/interference power measurements, reflects the effects of the scaled interference cancellation.

Figure 4:
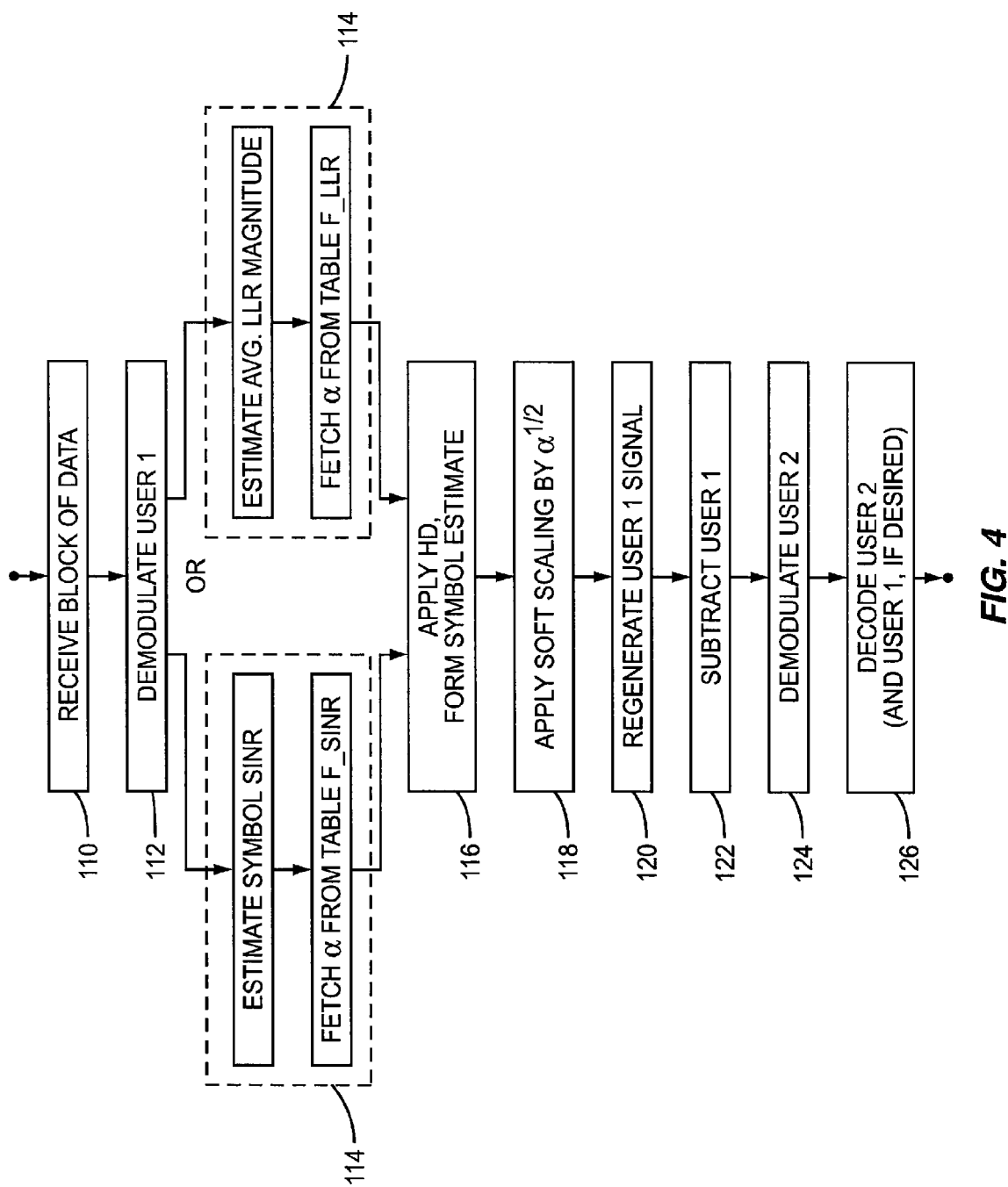
FIG. 4 is a logic flow diagram of another embodiment of a method for carrying out the interference cancellation teachings presented herein.

A flow chart of such processing is given in FIG. 4, which should be understood as a more detailed example of the method 100 illustrated in FIG. 3. The processing of FIG. 4 refers to "user 1" and "user 2" signals, which may be different user signals, different data streams, etc. At a minimum, the user 2 signal is a desired signal, and the processing given in FIG. 4 represents the hard-detection of user 1 symbols as interfering symbols with respect to user 2.

Processing begins with receiving a block of data (Block 110), which includes user 1 and user 2 symbols. Processing continues with demodulation of the user 1 symbols (Block 112), and determining the appropriate soft scaling factor value to use for scaling the hard decisions (Block 114). The processing of Block 114 includes estimating symbol SINR and using the estimated symbol SINR to fetch or otherwise determine the appropriate value of the scaling factor α (or, equivalently, $\sqrt{\alpha}$). Alternatively, the processing of Block 114 includes estimating the average LLR magnitude and correspondingly fetching or otherwise determining the appropriate value of the scaling factor.

Processing continues with applying hard decisions at the symbol or bit level to the user 1 symbols (Block 116), and correspondingly scaling those hard decisions by the scaling factor (e.g., by multiplying the hard decision values with the scalar-valued $\sqrt{\alpha}$) (Block 118). This scaling generates scaled interfering symbol estimates for user 1, and processing thus continues with obtaining a reduced-interference composite signal by combining the scaled interfering symbol estimates with the composite signal (i.e., the combined user 1 and user 2 composite signal). For example, the receiver may regenerate the user 1 signal by applying channel estimates to the scaled interfering symbol estimates (Block 120), and then subtract the regenerated user 1 signal from the composite signal (Block 122).

That subtraction produces a reduced-interference composite signal, and processing thus continues with demodulating the desired user 2 signal from the reduced-interference composite signal (Block 124), and decoding the demodulated symbols to recover the user 1 data (Block 126). Note that the user 1 symbols also may be decoded, depending on whether or not the user 1 signal is also a signal of interest.

Figure 5:
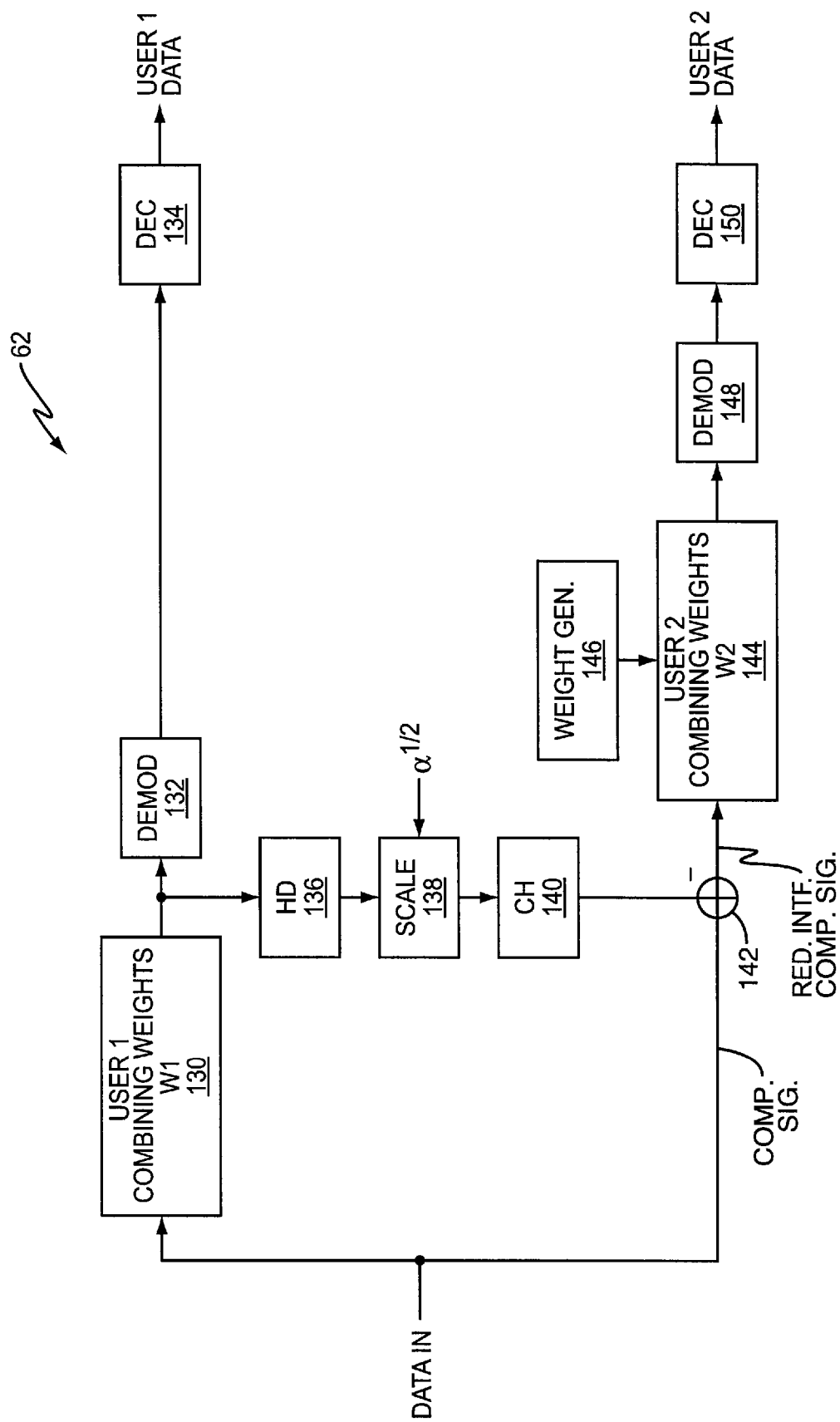
FIG. 5 is a block diagram of another embodiment of a mobile station receiver configured according to the interference cancellation teachings presented herein.

FIG. 5 illustrates an embodiment of the baseband processor 62, as introduced in FIG. 2, wherein the illustrated configuration implements the method of FIG. 4. The baseband processor 62 in this configuration includes a weighting circuit 130, a demodulator 132, a decoder 134, a hard decision processor 136, a scaling circuit 138 (which may comprise or otherwise be part of the earlier-described scaling processor 74), a channel processor 140, a combining circuit 142, a weighting circuit 144, a combining weight processor 146, a demodulator 148, and a decoder 150.

In FIG. 5, the interfering symbols for user 1 are hard-detected at the symbol level, after application of user 1 weights (w1) by the weighting circuit 130. That is, hard detector 136 provides hard decisions on the user 1 symbols. In turn, the scaling circuit 138 soft-scales the hard-detected interfering symbol values, e.g., by multiplying them by $\sqrt{\alpha}$, where the value of a is fetched from a look-up table or is otherwise determined in dependence on the received signal quality. (The "received signal quality" in this sense may be the most recent measure of received signal quality, such that the actual soft scaling value used is appropriate for the current or prevailing received signal quality.)

The scaled interfering symbols are then combined with the composite signal, such as by passing them through the channel processor 140 and then subtracting the channel-adjusted, scaled interfering symbols from the composite signal, via the combining circuit 142. It should be noted that the channel processor 140 applies the estimated propagation channel coefficients to the scaled interfering symbol estimates. The channel processor 140 includes a channel estimation circuit, or is associated with one, and thus has access to the complex channel coefficients estimated for the propagation path(s) between the receiver and transmitter The combining circuit 142 outputs a reduced-interference composite signal, which represents the incoming composite signal with the reconstructed interfering symbols subtracted from it. Weighting circuit 144 applies user 2 combining weights to the reduced-interference composite signal. Notably, in one or more embodiments, the baseband processor 62 compensates or otherwise adjusts its combining/equalization weight computation process to account for the extent of interfering cancellation, such that its interference model is matched to the actual cancellation that is carried out. In one such embodiment, the baseband processor 62 accounts for interference cancellation by scaling the interference power or covariance term for the interfering signal by a scaling factor that is equal to the value α as used for soft scaling the hard-detected interfering symbols, or is determined from another function of the same α. For example, a receiver could be configured to apply a scaling factor heuristically determined as a monotonic function of α. In any case, the weight generator 146, which includes or is associated with an impairment correlation processor that provides interference power or covariance terms for the interfering signal(s) accounts for the soft scaling that is applied to the user 1 signal.

The weighted signal values output from the weighting circuit 144 are input to the demodulator 148, and the demodulated values are then input to the decoder 150, for decoding of user 2 data. Also, as noted, to the extent that the user 1 signal is of interest, the demodulated user 1 signal values may be decoded by the decoder 134, for recovery of user 1 data.

Figure 6:
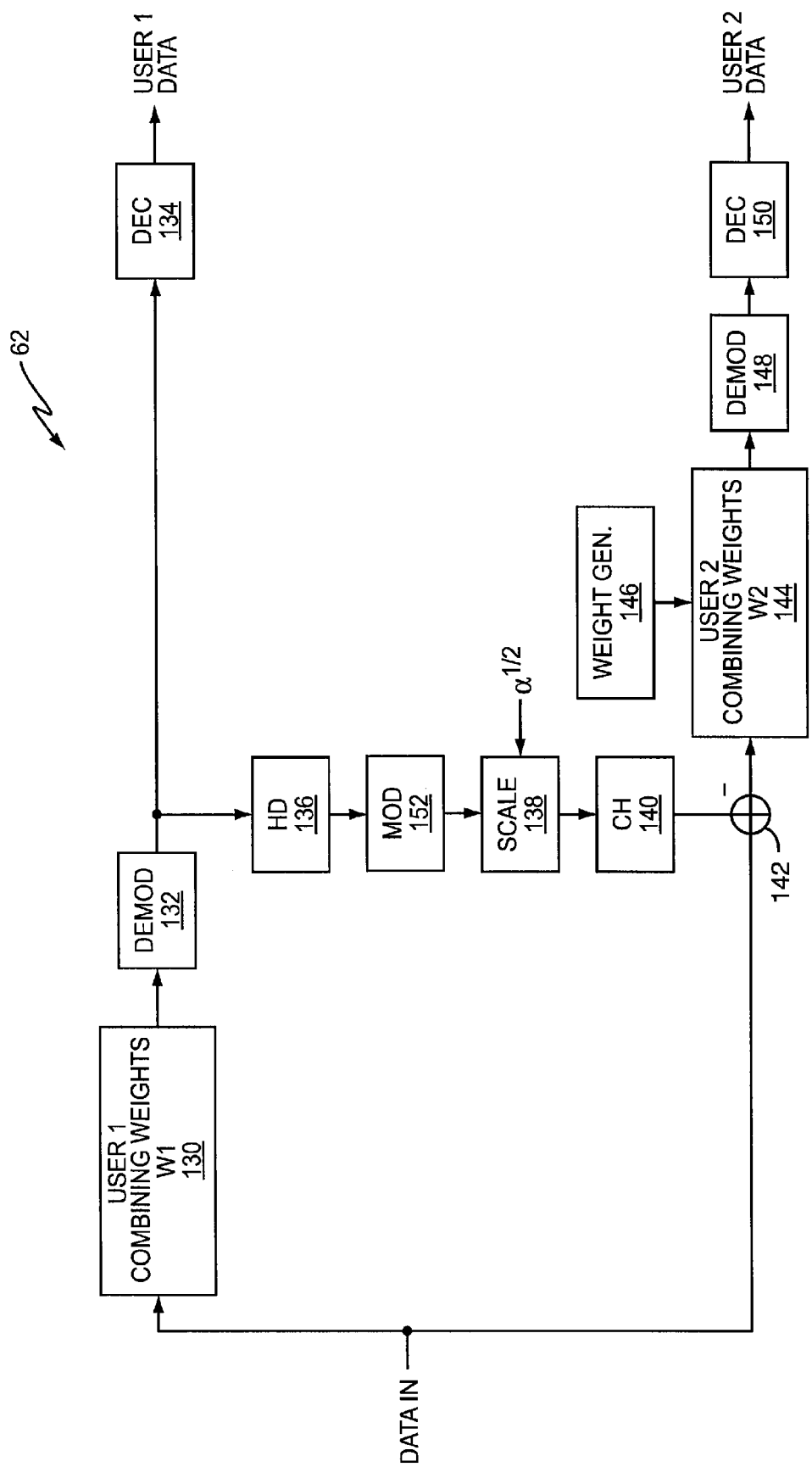
FIG. 6 is a block diagram of another embodiment of a mobile station receiver configured according to the interference cancellation teachings presented herein.

FIG. 6 illustrates another embodiment of the baseband processor 62. The primary difference between FIGS. 5 and 6 is that FIG. 5 illustrated hard detection at the symbol level for the interfering user 1 signal, while FIG. 6 illustrates hard detection at the bit level for the interfering user 1 signal. Thus, the hard decision processor 136 is positioned after the demodulator 132, for making hard decisions on the demodulated bit soft values obtained by demodulating the user 1 symbols. These hard bit decisions are re-modulated via a modulator 152, which simply may "map" groups of hard-detected bits into corresponding modulation symbols, according to the modulation constellation in use. These modulation symbols are then scaled as in FIG. 5, according to the value of the scaling factor $\sqrt{\alpha}$ appropriate for the current received signal quality. The balance of the processing is as described for FIG. 5.

Those skilled in the art will recognize that the circuit elements of FIGS. 5 and 6 may represent physical circuit elements. That is, at least some of the illustrated circuit elements, e.g., demodulator 132, hard decision processor 136, scaling circuit 138, etc., may be implemented as dedicated circuitry (pure hardware). However, it also should be understood that one or more of the circuit elements represented in these diagrams may be "functional" circuits, implemented in a general or special-purpose signal processor or microprocessor through the execution of stored computer program instructions. In this sense, execution of the stored computer program instructions by the baseband processor 62 specially configures it to carry out the method operations disclosed herein.

Those skilled in the art will also appreciate that the teachings presented herein may also be applied to the post-decoding approach, where the soft values obtained at the output of a decoder are used to re-generate the interfering user signals. In that case, the preferred embodiment would be to use the scaling factor $\alpha = F_{LLR}(E[\lambda_m^{out}])$. Alternatively, the scaling factor $\alpha$ may be tabulated as $\alpha = F_{LLRin,it}(E[\lambda_m^{in}], N_{it})$ or $\alpha = F_{SINRin,it}(SINR_{in}, N_{it})$, considering the decoder input conditions and the number of decoding iterations performed. Corresponding functional results may be tabulated as was described earlier herein, and stored in look-up tables.

Broadly, the teachings presented herein implement an IC receiver structure that is robust and has low incremental complexity compared to a non-IC receiver. The performance is improved and the whole SIR range of the receiver is handled without requiring heuristic mechanisms for turning the IC feature on and off, and it should be understood that the disclosed scaling of hard-detected values represents a significant complexity decrease to achieve a robust interference cancellation performance as compared to interference cancellation based on full soft-value processing of the interfering signals. The look-up table embodiments presented herein are particularly simple to implement, but, of course, the teachings herein are not limited to look-up table embodiments.

Further, it should be understood that these teachings apply directly to a wide range of receiver types and to a wide range of communication signal types. In an example embodiment and with reference back to FIG. 1, the network 20 is a Wideband-CDMA (WCDMA) network, and the base station 10 is configured as a WCDMA base station. In another embodiment, the base station 10 is configured as a Long Term Evolution (LTE) base station. The mobile stations 12, 13, and 15 are correspondingly configured, and thus may be WCDMA or LTE devices, or may be compatible with more than one standard/protocol. Of course, these embodiments are given as non-limiting examples, and the term "mobile station" should be given broad construction herein. Non-limiting examples of a mobile station include cellular radiotelephones, smartphones and PDAs, palmtop/laptop computers, network interface cards, etc.

As such, the present invention is not limited to the foregoing discussion and accompanying drawings. Instead, the present invention is limited only by the following claims and their legal equivalents.

What is claimed is:

1. A method of interference cancellation comprising:
generating interfering symbol estimates for interfering symbols in a composite signal by making hard decisions at a bit or symbol level;
computing scaled interfering symbol estimates by soft scaling the interfering symbol estimates as a function of received signal quality, said soft scaling comprising determining a soft scaling factor that varies with changes in the received signal quality so as to apply greater attenuation to the interfering symbol estimates at lower received signal qualities and lesser attenuation to the interfering symbol estimates at higher received signal qualities;
obtaining a reduced-interference composite signal by combining the scaled interfering symbol estimates with the composite signal; and
detecting symbols of interest from the reduced-interference composite signal.

2. The method of claim 1, further comprising determining the received signal quality based on determining an average symbol quality after combining and equalization processing of the symbols of interest.

3. The method of claim 1, further comprising determining the received signal quality based on determining an average log-likelihood-ratio magnitude for the symbols of interest after demodulation.

4. The method of claim 1, wherein computing scaled interfering symbol estimates by soft scaling the interfering symbol estimates as a function of received signal quality comprises selecting a pre-computed soft scaling factor as a function of the received signal quality.

5. The method of claim 4, wherein selecting a pre-computed soft scaling factor as a function of the received signal quality comprises accessing a look-up table that is indexed as a function of received signal quality, said look-up table comprising a data structure containing different values for the soft scaling factor corresponding to different values or ranges of received signal quality.

6. The method of claim 5, further comprising storing different look-up tables for different modulation and coding schemes, and accessing a particular one of the different look-up tables in dependence on the modulation and coding scheme associated with the symbols of interest.

7. The method of claim 1, further comprising defining the scaling factor as a scalar value that takes on discrete or continuous values between zero and one, as a function of the received signal quality.

8. The method of claim 7, further comprising setting the scaling factor to unity if the received signal quality is above a defined quality threshold.

9. The method of claim 1, further comprising determining combining weights at least in part based on the scaling factor, said combining weights used in combining signal values for the symbols of interest.

10. The method of claim 1, wherein the received composite signal includes two or more signals of interest, and further comprising performing the method of claim 1 for at least one signal of interest in a corresponding one of two or more successive interference cancellation receiver stages, wherein each succeeding interference cancellation receiver stage detects a given one of the two or more signals of interest.

11. The method of claim 1, wherein the received composite signal includes two or more signals of interest, and further comprising performing the method of claim 1 for at least one signal of interest in a corresponding one of two or more parallel interference cancellation receiver stages, wherein each parallel interference cancellation receiver stage detects a given one of the two or more signals of interest.

12. The method of claim 1, further comprising determining the received signal quality as a signal-to-noise ratio (SNR) or a signal-to-noise-plus-interference ratio (SINR).

13. The method of claim 1, wherein making hard decisions at a bit or symbol level comprises one of making hard symbol decisions for the interfering symbols or demodulating the interfering symbols to obtain soft bit values and making hard decisions on the soft bit values.

14. A wireless communication receiver comprising one or more processing circuits configured to:
  generate interfering symbol estimates for interfering symbols in a composite signal by making hard decisions at a bit or symbol level;
  compute scaled interfering symbol estimates by soft scaling the interfering symbol estimates as a function of received signal quality, said soft scaling comprising determining a soft scaling factor that varies with changes in the received signal quality, so as to apply greater attenuation to the interfering symbol estimates at lower received signal qualities and lesser attenuation to the interfering symbol estimates at higher received signal qualities;
  obtain a reduced-interference composite signal by combining the scaled interfering symbol estimates with the composite signal; and
  detect symbols of interest from the reduced-interference composite signal.

15. The wireless communication receiver of claim 14, wherein the one or more processing circuits comprise a signal quality processor that is configured to determine the received signal quality, and a scaling processor that is configured to apply the scaling factor to hard symbol or bit decisions made for the interfering symbol estimates, to obtain the scaled interfering symbol estimates.

16. The wireless communication receiver of claim 14, wherein the receiver is configured to determine the received signal quality based on determining an average symbol quality after combining and equalization processing of the symbols of interest.

17. The wireless communication receiver of claim 14, wherein the receiver is configured to determine the received signal quality based on determining an average log-likelihood-ratio for the symbols of interest after demodulation.

18. The wireless communication receiver of claim 14, wherein the receiver is configured to compute the scaled interfering symbol estimates by selecting a pre-computed soft scaling factor as a function of the received signal quality and scaling the interfering symbol estimates by the pre-computed scaling factor.

19. The wireless communication receiver of claim 18, wherein the receiver is configured to access a look-up table that is indexed as a function of received signal quality, said receiver including or otherwise having access to memory storing the look-up table, which comprises a data structure containing different values for the soft scaling factor corresponding to different values or ranges of received signal quality.

20. The wireless communication receiver of claim 19, wherein the memory stores different look-up tables for different modulation and coding schemes, and wherein the receiver is configured to access a particular one of the different look-up tables in dependence on the modulation and coding scheme associated with the symbols of interest.

21. The wireless communication receiver of claim 14, wherein the receiver is configured to use a scalar value as the scaling factor, wherein said scalar value takes on discrete or continuous values between zero and one, as a function of the received signal quality.

22. The wireless communication receiver of claim 14, wherein the receiver is configured to determine combining weights at least in part based on the scaling factor and to use said combining weights to combine signal values for the symbols of interest.

23. The wireless communication receiver of claim 14, wherein the receiver comprises a successive interference cancellation receiver including two or more successive interference cancellation stages at least one of which is configured to perform interference cancellation via soft scaling of hard decisions made for interfering symbols included in a composite signal input to that stage, or the receiver comprises a parallel interference cancellation receiver including two or more parallel interference cancellation stages at least one of which is configured to perform interference cancellation via soft scaling of hard decisions made for interfering symbols included in a composite signal input to that stage.

* * * * *

UNITED STATES PATENT AND TRADEMARK OFFICE
CERTIFICATE OF CORRECTION

PATENT NO. : 8,238,499 B2  
APPLICATION NO. : 12/201303  
DATED : August 7, 2012  
INVENTOR(S) : Reial Page 1 of 1

It is certified that error appears in the above-identified patent and that said Letters Patent is hereby corrected as shown below:

In Column 7, Line 29, delete "d," and insert -- $d_1$ --, therefor.

In Column 10, Line 32, delete "of a" and insert -- of $\alpha$ --, therefor.

Signed and Sealed this
Thirteenth Day of November, 2012

David J. Kappos
*Director of the United States Patent and Trademark Office*